Patented Nov. 12, 1929

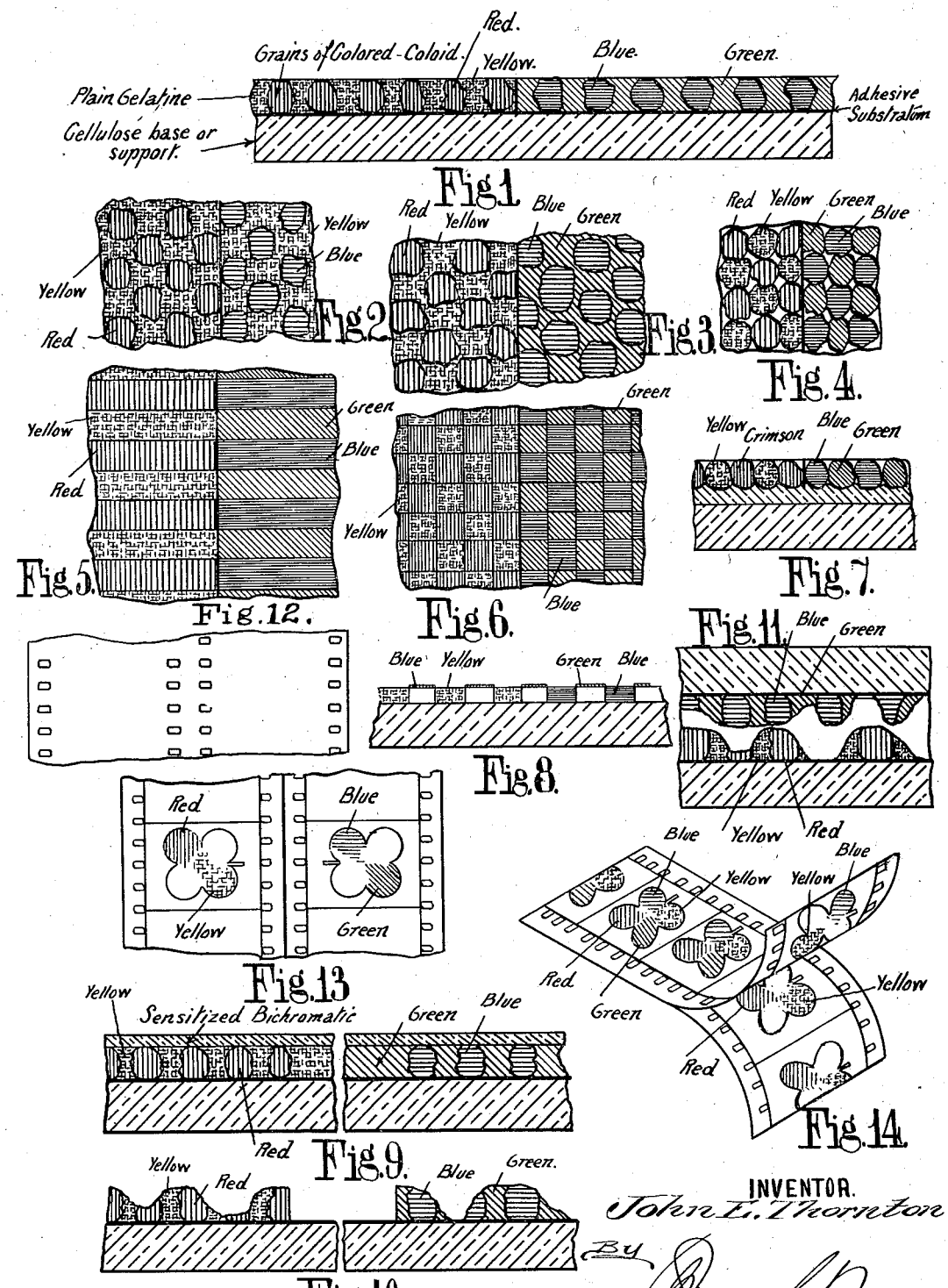

1,735,810

UNITED STATES PATENT OFFICE

JOHN EDWARD THORNTON, OF LONDON, ENGLAND, ASSIGNOR TO JOHN OWDEN O'BRIEN, OF MANCHESTER, ENGLAND

MULTICOLOR CINEMATOGRAPH AND OTHER FILM

Application filed May 5, 1924, Serial No. 711,253, and in Great Britain May 18, 1923.

This invention relates to the production of transparent multi-color cinematograph or other film-positives in four or three colors or tones of color.

In my application Serial No. 711,251, filed May 5, 1924, I have described a multi-color cinematograph or other film-positive built up from four component images, each representing a section of a four-image picture comprising either four or three colors as desired, two of the component images being formed upon one thin film and the other two upon another thin film, the two films preferably being obtained by longitudinally covering a double-width film upon which two pairs of images have been formed side by side.

This invention consists in such a film produced by only two component images, each image comprising two colors, and each photographically produced as a fine mosaic of interspersed colored lines, dots, or grains upon one thin strip. The image of each strip may be described as a half-picture. The colors of one strip are different from the colors of the other strip, so that the two strips comprise four colors in all but only two images. Subsequently the two strips are cemented together with the interspersed colors of one film superimposed upon those of the other to bring the two component images and the four colors within one picture-area.

In all methods hitherto proposed for producing multi-color pictures by means of interspersed lines or dots it was proposed to produce the entire picture in one piece as a complete picture in or by means of one mosaic containing all the colors and in one colloid layer upon one support.

There are great technical difficulties in the production of suitable film-material for such pictures in large quantities and the cost of production is almost prohibitive.

By the present invention these objections are overcome by the simple device of doubling the surface area of the film support and halving the number of colors in each section of such surface, thus forming two half-pictures, each containing only two colors upon each half of the support, and then severing the film into two parts and superimposing the two films, each with its half-picture, and cementing them together to form one film composed of two half-pictures containing four component colors. The double-area or double-width film support is made of only half standard thickness and, when the two parts are cemented together, they produce a film of standard size and thickness.

The two two-color component images in this invention are therefore formed in two colloid layers upon two supports.

Film-positives according to this invention are produced by printing on to the special double-area mosaic film-material described in a co-pending application for U. S. patent, Serial No. 60,347, filed October 3, 1925, which is much easier to manufacture than mosaic film-material of the types hitherto known. It is not only easier to produce four-color prints by this method than by any method previously known, but they are of better quality. Furthermore, their delicate colored images can, if desired, be enclosed and protected from scratches within the body of the film by uniting the two parts image-face to image-face. On the other hand, the two parts can be united back-to-back with their two images upon the outer faces of the film; or they can, if desired, be united face-to-back.

The present invention is a development of and improvement upon the process described in my British Patent No. 8300 of 1915, dated June 4, 1915, and my United States Patent No. 1,263,962, dated April 23, 1918, in which a multi-color picture of mosaic formation is formed in a single layer of colloid attached to a single transparent support.

The invention can be applied to the production of cinematograph pictures upon continuous film strips or to non-cinematograph pictures upon any type of transparent support, such as glass plates, thick stiff film-plates, thin rollable films, or extremely tenuous transfer films.

The invention will be fully described with reference to the accompanying drawings, wherein:

Figure 1 is a view showing the greater portion of a double width film in transverse section and on an enlarged scale, having the coloring matter applied thereto in accordance with this invention.

Figure 2 is a sectional plan view of a portion of a double width film in which the colored grains have been applied and the gelatin layer has been colored yellow to give the three-color material.

Figure 3 is a similar view of a four-colored material, one half width of the gelatin being colored yellow and the other half width being colored green.

Figure 4 is a view similar to Figure 2 in which both color screens are formed of differently colored grains.

Figure 5 is a similar view to Figure 2 in which the colors are applied in very fine parallel lines.

Figure 6 is a similar view to Figure 5 in which the colors are applied in a geometrical pattern.

Figure 7 is a transverse section of that film shown in Figure 4.

Figure 8 is a transverse section showing the blue and green coloring applied as by printed lines.

Figure 9 is a transverse section showing the sensitized layer as applied to a double width material.

Figure 10 is a similar view showing the relief images after the surplus material has been washed away.

Figure 11 is a transverse section of the finished film after the superimposition, showing the relief images face to face.

Figure 12 is a plan view showing the celluloid base.

Figure 13 is a plan view of a double width material showing the image formed in minute dots, the dots being colored either blue, green, red or yellow, according to the color in the picture.

Figure 14 is a perspective view of the double width film in the process of being superimposed, that is, the image face to image face to give a finished film of a single width.

In their separate states each thin section-film consists of a strip of transparent celluloid or other waterproof material, having secured to one face a specially prepared layer of sensitive two-colored non-waterproof colloid (Figure 1) capable of producing a two-color image in adjacent areas in the same layer or stratum by photographic means, comprising exposure to light followed by development and treatment, as hereinafter more particularly described.

In its complete state the finished four-color film consists firstly of two such strips of thin film each printed in two colors (Figure 15) and finally cemented together to form one single film (Figure 14) of compound-layer but otherwise standard form and thickness, and having the complete four-color picture thereon and preferably enclosed and embedded within the body of the film, protected and sandwiched between two outer layers of transparent waterproof material by which the delicate color-picture is protected against all possibility of being scratched whilst being handled or during its passage through the projection machine.

In the preferred form of the invention for a four-color picture (Figures 1 and 3 to 8) one two-color film-print is made comprising section pictures consisting for example of crimson and yellow and another two-color film-print comprising section-pictures of blue and green. If the prints are carefully made in the correct shades of color the picture resulting from combination of the two section-prints will, when viewed as a transparency, apparently contain the following colors:—crimson, yellow, blue and green by direct colors, and orange, blue-green, purple, brown, black, and other shades indirectly by combination of two or more colors, so that in effect there will be a larger number of colors or shades which still further lengthen the color scale (Figure 11).

When a three-color picture is required (Figure 2), which is usually composed of red, blue and yellow, two of the colors, for example red and yellow, are printed upon one section-film and the remaining color, blue, upon the other section-film along with a duplicate of one of the colors upon the first film, for example yellow.

I have indicated a combination of coloring such as crimson and yellow (which are not complementary) for one thin film, and similarly blue and green for the other thin film, therefore the complementary colors to those in the first film will be found only in the second.

The invention is not restricted to any particular combination but may have its colors arranged in the most convenient combination for printing.

The above is a broad outline of the invention and I will now give a more detailed description of the various sections or steps of the complete process.

*The primary (or camera) negatives*

It will be obvious that the original (or camera) section-negatives must have their color values correctly balanced by the use of correct color filters when photographing to produce the negatives.

Any set of the original color-section negative (camera) images may be reversed in relation to another by the use of prisms when photographing, in order that prints will correctly face when brought together.

The secondary negatives or printing-clichés

The term negative is also hereinbefore used in the sense that it indicates the cliché-strip or strips used for printing from, although in some of the printing processes described a negative-image printing-cliché is required, and for other processes a positive-image printing-cliché is required.

Also some of the printing processes described require printing to be done from the back through the transparent celluloid base, and other processes require printing to be done from the front. Therefore the printing-clichés must be prepared to suit the particular printing process adopted.

Also in reproducing from the primary negatives secondary images to form the printing-clichés, care must be taken to make one group or set of printing-clichés face one way and the other set the reverse way, so that the prints made therefrom will correctly assemble face to face.

Any primary negatives or secondary printing-clichés that are not correctly arranged at the start can be reconstructed by reproduction through cameras and reversing prisms in any well-known manner.

Film material

For the film base any suitable transparent material may be used, but material such as celluloid, cellulose-acetate, or the like is preferred because it is waterproof and substantially non-stretchable.

For the sensitive layer intended to be printed with the two-color photographic images any suitable non-waterproof colloid may be used, as hereinafter more particularly described.

The waterproof base is preferably made about .002 inch thick and the colloid coating about .001 inch thick, making a section-film having a total thickness of about .003 inch, and the two layers of different physical characteristics, (celluloid and colloid) must be indissolubly united or amalgamated by the usual means known to those versed in the art of film manufacture.

Sensitizing and printing processes

The following are different methods of arranging and manufacturing the special colloid layer of the film material in parallel stripes in order that it will produce two section-images of different colors side-by-side in adjacent areas of the same layer or strata.

(A) For non-reinforced film-material the waterproof cellulose base or support is first prepared with the usual adhesive substratum known to those versed in the art of film manufacture, and is next coated with a layer of plain gelatine of about .001 inch thick, taking the thickness as being measured after drying, but it will obviously be thicker whilst wet.

To this gelatine layer is attached, after it has set and before it is dried, a vast number of grains of colored colloid (Figure 4), in a single layer one grain deep, which are then rolled by pressure rolls into the soft colloid layer until they are embedded therein and flush with the surface thereof (Figure 1), so that the two materials present a common level surface.

These colored grains may be of gelatine, starch, or similar colloid capable of being readily dyed, and are prepared by means well-known. They are either prepared with a self-mordanting dye or with an ordinary dye which is afterwards mordanted.

The colloid layer is allowed to dry, after which it is dyed with a type of dye that will not unite with or affect the coloring of the dyed grains, so that the spaces between the grains will be dyed with a different color and the film will therefore be colored over its entire surface to two different colors, for example crimson and yellow.

This two-color film is sensitized by a bichromate bath and dried (Figure 9), after which it is printed first under one section-negative through a color filter that will only allow the crimson areas to print, and then printed again from another section-negative through another color filter that will only allow the yellow areas to print.

Printing is effected by exposure from the back to negative and light through the celluloid base, and thus the colored areas are rendered insoluble in varying degrees according to the gradations of the negative.

The film is next developed with hot water, which dissolves and washes away all colored areas that have not been rendered totally insoluble or partially insoluble, and the result is the equivalent of what is commonly known as a "carbon print", but with the difference that it will be a two-color carbon print instead of the ordinary monochrome carbon print (Figure 10).

The exposure for this process of bichromate printing is somewhat prolonged, but the process has the merit of simplicity and cheapness and nothing beyond exposure and hot water development is required to complete the print.

But where a quicker printing process is required a gelatino-silver emulsion is substituted for the above described plain gelatine layer, and is also used for forming the grains. Both the sensitive gelatino-silver layer and the sensitive gelatino-silver grains are each dyed their respectively different colors in the manner already described.

Such a gelatino-silver two-color film is exposed and printed from the back as in the bichromate film, is developed, fixed, washed and otherwise treated in the orthodox way as for an ordinary monochrome print, after which it is treated in a bath which has the effect of hardening or insolublizing the gelatine in proportion to the light action and the amount of reduced silver, thus bringing the silver-colloid image into the same state as the aforesaid bichromated-colloid image. The film is next preferably dried to better complete the condition of insolublization and is next developed with hot water to turn it into a two-color relief image of the "carbon" type (Figure 9). The insolublizing bath has the effect also of bleaching the black image of silver, which may then be allowed to remain in the film, but greater transparency is attained if the whole of the silver is dissolved and removed by potassium ferricyanide followed by sodium thiosulfate fixing bath, or by any other well-known preferred means, thus leaving a two color image consisting of dyed colloid only.

The gelatino-silver method therefore has the merit of requiring a very short exposure to light during printing, but involves the need of several operations and use of chemical baths in finishing that are not required in the slower-printing bichromate process.

The other film is prepared in the same manner, but with two complementary colors, for example blue and green.

(B) In the next alternative method of manufacturing the film material (the waterproof cellulose base) is prepared with a thin layer of adhesive varnish, upon which is dusted or spread whilst in a tacky condition a single layer of colloid grains, consisting of grains dyed in one color such as crimson, and grains dyed another color such as yellow (Figures 4 and 7). These are weighed out in equal portions and then thoroughly mixed, after which they are dusted on; the tacky coating is next dried and the surplus powder dusted off, when it will be seen that the entire film support is evenly covered with a layer of grains of two colors evenly mixed and distributed, but with uncovered transparent spaces between the grains.

This film may be of either the silver or bichromate variety, and treated in the manner already described.

(C) In the next alternative the film is prepared with colored grains as in Example B, but is afterwards submitted to rolling between pressure rolls, in order to flatten and spread the grains until they close up the transparent spaces and yield a homogeneous layer (Figure 6). Otherwise the process and treatment is the same as B.

(D) In the last alternative (Figs. 5, 6, 7 and 8) the film base is coated with a layer of gelatine and then dried. It is next printed with a series of exceedingly fine lines in one of the colors of mordanted dyes (Figures 5 and 8). When these are dry the film is next dyed in a bath of the other color, which will only enter the unmordanted and absorbent portions of the film between the already printed lines, and the latter will remain unaffected by the second color.

The film will then present an even layer of alternating colored lines. Otherwise the sensitizing, printing, and development are as already described. The dyes may be applied by relief-printing blocks, or intaglio-engraved plates or rollers which give sharper lines or prints than blocks.

As this method gives a constantly recurring pattern it is preferred to so arrange it, by making the pattern an inexact division of a complete picture area, that the dots, lines, mosaic or pattern do not recur in the same place in every succeeding picture, and this arrangement, coupled with persistence of vision, obliterates on the screen any semblance of pattern or grain.

In methods A, B and C this result is secured automatically, as all three methods produce the "accidental dot" type of result.

From the above description it will be clear that the two images formed in different colors on each thin film strip do not superimpose, but are interspaced in adjacent areas of the same stratum.

But when the two printed films are laid over each other and cemented together one two-color image will be superimposed upon the other two-color image (Figure 11), and in cases where the colors overlap other colors will be seen as a result of the combination.

More detailed particulars of the method of manufacturing this granular film material will be found in my British Patent No. 8,300/15, dated June 4, 1915.

*Shrinkage*

Uniform shrinkage is secured by simultaneous printing, developing, washing, drying and other operations for both films, and the same temperature of all solutions, drying rooms, or other sources of expansion and contraction, and this is more easily accomplished when the two films are first made as one double-width strip.

For convenience in printing the film and to ensure that expansion and contraction of both sections will be alike, the film material is manufactured as a double-width strip, one half of which is constructed to give a section-picture of two-colors only, and the adjoining half to give a section-picture of two other colors, all four colors being printed at one operation. After the strip has been printed, developed and otherwise treated and dried it is longitudinally severed to form two strips, which are constructed, used, and treated as herein described.

*Assembling and completing*

Having completed each of the two-color thin section-positives, it now only remains to assemble and unite them face to face (Figure 14), so that their images are completely enclosed. This is done by first coating the printed face of each strip with an exceedingly thin layer of adhesive material, then drying same, then moistening same and, after correctly assembling and registering the two strips by their registering pins, applying pressure picture-by-picture and step-by-step until the two films are indissolubly united and become as one, with their pictures inside and waterproof base or support layers outside, provided with perforations for feeding the completed film through any standard projector.

What I claim as my invention and desire to protect by Letters Patent is:—

1. A multi-color picture-positive having two transparent supports and two component images of two-color interspersed mosaic character each forming a half-picture, one half-picture of two colors being formed upon one support and the other half-picture of two colors upon the other support, the two supports with their two half-pictures being superimposed and cemented together with their two half-pictures superimposed within one picture-area, forming a single multi-color picture in which the colors are represented by four image-analysis.

2. A multi-color picture-positive having four component images in two half-pictures comprising two transparent supports, a half-picture containing two component images in colors of interspersed mosaic upon one support and a half-picture containing two colors of interspersed mosaic upon the other support, the two transparent supports being superimposed with the two half-pictures assembled and disposed within one picture area and cemented together.

3. A multi-color picture-positive having four component images in two half-pictures comprising two thin transparent supports, a half-picture containing two colors of interspersed mosaic upon one thin support and a half-picture containing two colors of interspersed mosaic upon the other thin support, the two transparent supports being superimposed with the two half-pictures assembled and disposed within one picture area and cemented together.

4. A multi-color picture-positive having four component images in two half-pictures and comprising two thin transparent supports of half thickness, a half-picture containing two colors of interspersed mosaic upon one thin support and a half picture containing two colors of interspersed mosaic upon the other thin support, the two transparent supports being superimposed with the two half-pictures assembled and disposed within one picture area and cemented together.

5. A multi-color picture-positive having four component images in two half-pictures and comprising two thin transparent supports of half thickness, a half picture containing two colors of interspersed mosaic upon one side of one thin support and a half-picture containing two colors of interspersed mosaic upon one side of the other thin support, the two transparent supports being superimposed with the two half-pictures assembled and disposed within one picture area and cemented together.

6. A multi-color picture-positive comprising two transparent supports to provide double the picture area that a single support provides, two colors of interspersed mosaic on one transparent support and two colors of interspersed mosaic on the other transparent support, the two transparent supports of double area superimposed one on the other, the several corresponding mosaics assembled and disposed within one picture area and cemented together.

7. A multi-color film positive comprising two thin supports, each of half thickness, an interspersed mosaic in different colors on one side of one thin support, an interspersed mosaic in different colors on one side of the other thin support, the two thin supports being superimposed with the several component mosaics assembled and disposed within the picture area and cemented together, the picture side of one to the picture side of the other.

8. A two-part mosaic colored photographic film material comprising a transparent support of double picture area, an adhesive substratum attached to one face of the support, two single areas of multi-color colloid attached to the face of the substratum, one area containing two colors of the mosaic and the other area containing the other two colors of the mosaic, the two colors of each area being interspersed and intermixed to form a single layer of colloid, the elements of the mosaic being in close juxtaposition to each other, the support being adapted to be severed for printing and finishing the images thereon to form two half pictures each containing two colors, and the half pictures on the two supports being adapted for cementing together to form a complete multi-color picture built up from two supports and as mosaics assembled and superimposed in one picture area.

9. A two-part mosaic colored film material for the production of multi-color positive pictures, comprising a transparent waterproof support of double width and a half thickness, two stripes of multi-color sensitized colloid on one surface and extending longitudinally throughout the strip, each stripe formed with a mosaic pattern therein of two colors, the support being adapted to be severed longitudinally after printing and the two parts to be cemented together with the images printed on one support superimposed upon the images printed on the other support.

10. A film material for the production of multi-color positive pictures comprising a transparent water-proof support of double width and half thickness, two stripes of multi-color sensitized colloid on one support and disposed longitudinally thereof, each stripe formed with an appropriate number of irregularly disposed grains of two colors embedded in the colloid, the support being adapted to be severed longitudinally after printing, and the images printed on one support superimposed upon images printed on the other support.

11. A two-part mosaic colored film material for the production of multi-color pictures, comprising a transparent base, two parallel stripes of multi-color colloid thereon, coloring matter in two colors in each colloid stripe disposed in mosaic form, the colors being intermixed and interspersed in close juxtaposition in the colloid layer, two colors in one parallel stripe, and two colors in the other parallel stripe.

12. A two-part mosaic colored film material for the production of multi-color pictures comprising a double width strip of transparent celluloid, a layer of uniting substratum superimposed upon the celluloid, a layer of colored colloid superimposed upon the substratum composed of two parallel stripes of different colorings, one stripe being composed of minute adjacent areas of two colors and the other stripe being composed of minute adjacent areas of two colors, the combined layers being indissolubly united and amalgamated and forming one homogeneous multi-color film strip of approximately one-half thickness, the film being adapted to be longitudinally severed after printing and finishing to form by joining the two parts together a single film of standard thickness.

In testimony whereof I have hereunto set my hand.

JOHN EDWARD THORNTON.